United States Patent
Newton

(10) Patent No.: US 10,779,554 B2
(45) Date of Patent: Sep. 22, 2020

(54) DUAL VALVE INJECTOR ASSEMBLY FOR DISPENSING A FOOD PRODUCT

(71) Applicant: Taylor Commercial Foodservice, LLC, Rockton, IL (US)

(72) Inventor: Robert K. Newton, Beloit, WI (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 0 days.

(21) Appl. No.: 16/126,633

(22) Filed: Sep. 10, 2018

(65) Prior Publication Data

US 2019/0000110 A1    Jan. 3, 2019

Related U.S. Application Data

(63) Continuation of application No. 14/356,756, filed as application No. PCT/US2012/064046 on Nov. 8, 2012, now abandoned.

(60) Provisional application No. 61/558,172, filed on Nov. 10, 2011.

(51) Int. Cl.
*A23G 9/28*    (2006.01)

(52) U.S. Cl.
CPC ............... *A23G 9/28* (2013.01); *A23G 9/281* (2013.01)

(58) Field of Classification Search
CPC .................................. A23G 9/28; A23G 9/281
USPC ....................... 222/482; 118/16, 25; 141/104
See application file for complete search history.

(56) References Cited

U.S. PATENT DOCUMENTS

| | | | | |
|---|---|---|---|---|
| 1,630,924 A | * | 5/1927 | Cieslak | A21C 15/007 222/310 |
| 1,800,368 A | * | 4/1931 | Tomlinson | A47J 31/46 137/594 |
| 2,118,976 A | * | 5/1938 | Larkin | A47J 25/00 222/386 |
| 2,262,293 A | * | 11/1941 | Lilja | A23G 9/281 137/625.24 |
| 3,052,381 A | * | 9/1962 | Carpigiani | A23G 9/281 222/132 |
| 3,170,676 A | * | 2/1965 | Koch | A23G 9/224 366/196 |
| 3,172,422 A | * | 3/1965 | Koch | A23G 9/281 137/375 |

(Continued)

FOREIGN PATENT DOCUMENTS

| | | |
|---|---|---|
| EP | 2 067 407 A2 | 10/2009 |
| GB | 2 326 633 B | 6/1998 |
| GB | 2 416 755 A | 8/2006 |

OTHER PUBLICATIONS

PCT International Preliminary Report on Patentability and Written Opinion for PCT/US2012/064046, dated May 22, 2014, 7 pp.

(Continued)

*Primary Examiner* — Patrick M. Buechner
*Assistant Examiner* — Michael J. Melaragno
(74) *Attorney, Agent, or Firm* — Barnes & Thornburg LLP

(57) ABSTRACT

A dual valve injector assembly having a base; a passageway in the base for receiving a food product; a first draw valve in communication with the passageway and a first spout, the first spout dispensing the food product at a first draw rate; and a second draw valve in communication with the passageway and a second spout, the second spout dispensing the food product at a second draw rate; wherein the second draw rate is lower than the first draw rate.

7 Claims, 1 Drawing Sheet

(56) References Cited

U.S. PATENT DOCUMENTS

| | | | | |
|---|---|---|---|---|
| 3,276,633 A * | 10/1966 | Rahauser | A23G 9/281; 222/129.1 |
| 3,330,129 A * | 7/1967 | Halverson | A23G 9/281; 222/145.3 |
| 3,615,675 A * | 10/1971 | Wisdom | A23G 3/2015; 425/113 |
| 3,868,050 A * | 2/1975 | Gorychka | A23G 9/281; 222/509 |
| 3,898,859 A * | 8/1975 | Duke | A23G 9/12; 62/135 |
| 3,934,759 A * | 1/1976 | Giannella | A47J 31/401; 222/129.1 |
| 3,989,492 A * | 11/1976 | Keyes | A23G 9/045; 62/136 |
| 4,788,071 A * | 11/1988 | Hayashi | B30B 11/265; 426/281 |
| 4,793,279 A * | 12/1988 | Grenier | A23G 9/28; 118/16 |
| 4,878,760 A * | 11/1989 | Newton | A23G 9/163; 366/149 |
| 4,881,663 A * | 11/1989 | Seymour | A23G 9/282; 222/132 |
| 5,382,090 A * | 1/1995 | Cocchi | A23G 9/281; 222/145.5 |
| 5,400,614 A * | 3/1995 | Feola | A23G 9/163; 366/102 |
| 5,405,054 A * | 4/1995 | Thomas | A23G 3/28; 222/105 |
| 5,487,493 A * | 1/1996 | McNabb | B67D 1/1466; 222/146.6 |
| 5,813,574 A * | 9/1998 | McNabb | A23G 9/228; 222/146.6 |
| 5,957,040 A * | 9/1999 | Feola | A23G 9/163; 220/630 |
| 6,213,174 B1 * | 4/2001 | Cook | G01G 13/06; 141/1 |
| 6,460,580 B1 * | 10/2002 | Cunha | A23G 9/045; 141/18 |
| 7,451,613 B2 * | 11/2008 | Barraclough | A23G 9/08; 222/146.6 |
| 8,496,141 B2 * | 7/2013 | McKay | A23G 9/282; 222/144.5 |
| 2003/0006254 A1 * | 1/2003 | Itou | B67D 1/1411; 222/518 |
| 2007/0116804 A1 * | 5/2007 | Cocchi | A23G 9/045; 426/100 |
| 2007/0262081 A1 * | 11/2007 | Feola | A23G 9/08; 221/8 |
| 2008/0093390 A1 * | 4/2008 | Yu | B05C 5/0212; 222/330 |
| 2009/0217825 A1 * | 9/2009 | Cocchi | A23G 9/22; 99/455 |
| 2010/0116846 A1 * | 5/2010 | Cortese | A23G 9/28; 222/66 |
| 2011/0114664 A1 * | 5/2011 | Wadle | B67D 1/0034; 222/145.6 |
| 2012/0104046 A1 * | 5/2012 | Wadle | A23G 9/12; 62/342 |
| 2013/0068331 A1 * | 3/2013 | Matz | F16K 11/07; 137/625.48 |
| 2014/0367424 A1 * | 12/2014 | Newton | A23G 9/28; 222/482 |

OTHER PUBLICATIONS

PCT International Preliminary Report on Patentability and Written Opinion for PCT/US 2012/064046, dated Jan. 28, 2013, 10 pp.

* cited by examiner

DUAL VALVE INJECTOR ASSEMBLY FOR DISPENSING A FOOD PRODUCT

CROSS-REFERENCE TO RELATED APPLICATIONS

This application is a continuation of U.S. application Ser. No. 14/356,756, which was nationalized under 35 USC § 371 on May 7, 2014, and was nationalized from PCT/US2012/064046, filed on Nov. 8, 2012, which claimed priority from U.S. Provisional Application No. 61/558,172, filed on Nov. 10, 2011, the entirety of each are hereby incorporated by reference herein.

BACKGROUND

The subject matter disclosed herein relates generally to dispensing food products, and more particularly to a dual valve injector assembly for dispensing a frozen food product at different draw rates.

Frozen food products, such as soft serve ice cream, may be served in a variety of manners including in a dish, a cone or injected into a confectionery (e.g., a pastry, cupcake, donut). Existing soft serve ice cream machines typically have one spout for delivery of a stylized frozen product onto a cone or dish. To use a single spout machine for injection requires removal of a design ring and the addition of an injector at the spout. Other existing soft serve ice cream machines include a separate barrel that contains the food product for injection and a dedicated injector. A dedicated injector is subject to contamination as the food product remains in the injector between draws. Improvements in dispensing a frozen food product for multiple serving suggestions, including injection, would be well received in the art.

SUMMARY

One embodiment includes a dual valve injector assembly having a base; a passageway in the base for receiving a food product; a first draw valve in communication with the passageway and a first spout, the first spout dispensing the food product at a first draw rate; and a second draw valve in communication with the passageway and a second spout, the second spout dispensing the food product at a second draw rate; wherein the second draw rate is lower than the first draw rate.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
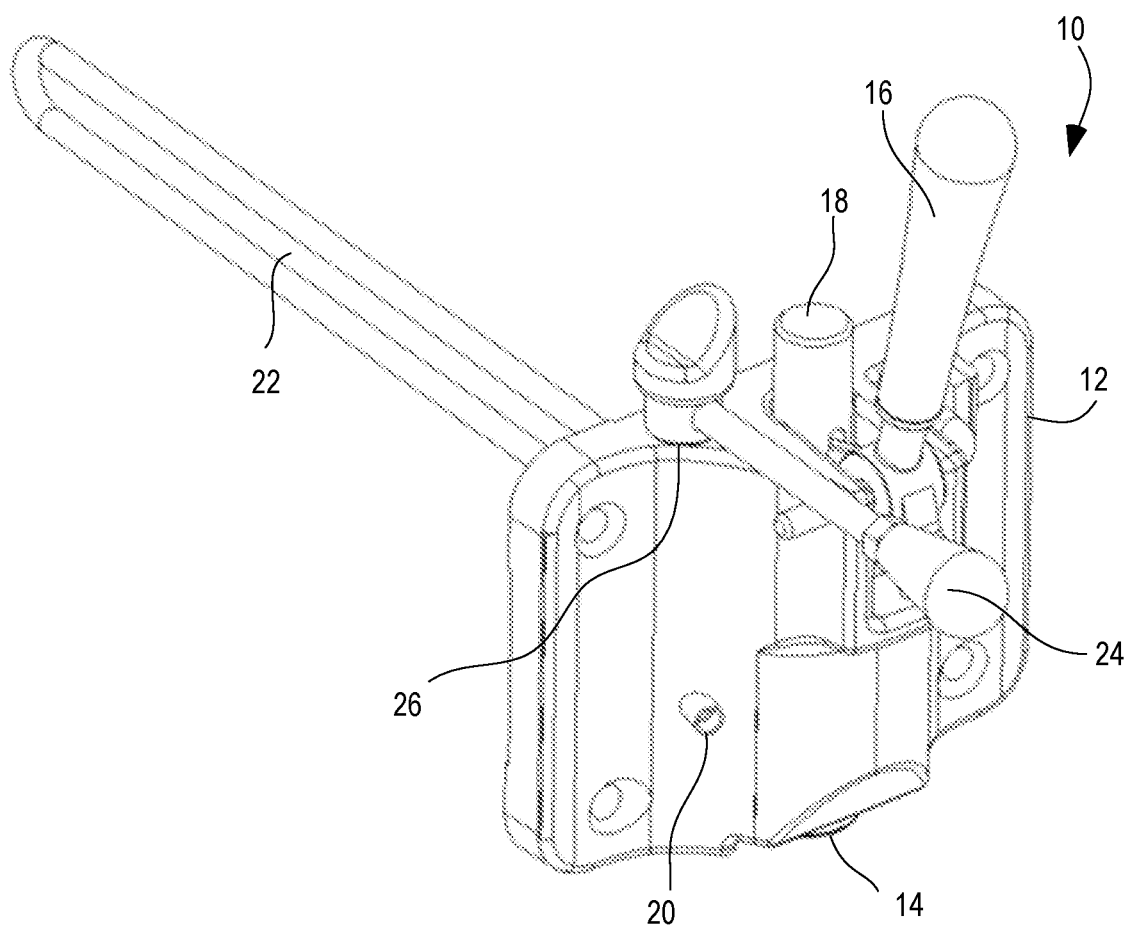
FIG. 1 depicts a dual valve injector assembly in exemplary embodiments.

Embodiments relate to a dual valve injector assembly for use with a frozen food product dispensing machine, such as a soft serve ice cream machine. It is understood that the dual valve injector assembly may be used with other food products, and embodiments are not limited to frozen food products. FIG. 1 depicts a dual valve injector assembly 10 in exemplary embodiments. The dual valve injector assembly 10 includes a base 12, which is mounted to a freezer door at a rear side of base 12. Baffle rod 22 extends from a rear side of base 12, for positioning within a beater in a freezing cylinder of a frozen food product dispensing machine. A passageway is formed in base 12 to receive the frozen food product from a mixing barrel and distribute the frozen food product to two valves in the dual valve injector assembly 10 as described herein.

The dual valve injector assembly 10 includes a first spout 14 for dispensing the frozen food product into a cone or dish. The first spout 14 is oriented to deliver the frozen food product in a generally vertical direction. A first draw handle 16 is used to operate a first draw valve 18 to dispense the frozen food product through first spout 14. First draw valve 18 is in communication with the passageway and dispenses the frozen food product at first spout 14 at a first draw rate of about 1 ounce of frozen food product per second. The construction of first draw valve 18 and size of first spout 14 control the draw rate of the frozen food product. It is understood that the draw rate of 1 ounce per second is an exemplary rate, for a particular food product, and that a variety of other draw rates may be employed with other food products, and other draw valve and spout configurations.

Figure 2:
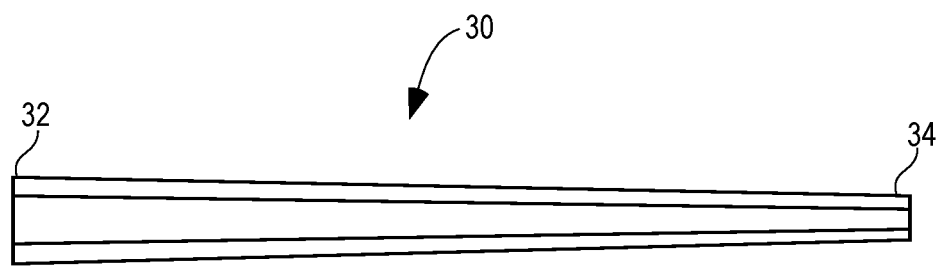
FIG. 2 depicts a confectionery injector in exemplary embodiments.

The dual valve injector assembly 10 includes a second spout 20 for dispensing the frozen food product into a confectionery injector 30, shown in FIG. 2. The second spout 20 is oriented to deliver the frozen food product in a generally horizontal direction. A second draw handle 24 is used to operate a second draw valve 26 to dispense the frozen food product at second spout 20. The second draw valve is in communication with the passageway and dispenses the frozen food product at a second draw rate, about ¼ to ⅛ ounce of food product per second. The second draw rate is lower than the first draw rate to provide more control of the frozen food product when injecting confectioneries. The construction of second draw valve 26 and size of second spout 20 control the draw rate of the frozen food product. It is understood that the draw rate of about ¼ to ⅛ ounce per second is an exemplary rate, for a particular food product, and that a variety of other draw rates may be employed with other food products, and other draw valve and spout configurations.

FIG. 2 depicts a confectionery injector 30 in exemplary embodiments. Confectionery injector 30 is a tubular member having a mounting end 32 that snaps or threads on to second spout 20. The exterior of the confectionery injector 30 tapers to an injection end 34 that is intended for insertion into a confectionery for injecting the frozen food product into the confectionery. The confectionery injector 30 may be disposable, so that once one or more confectioneries are injected with the frozen food product, the confectionery injector 30 may be discarded. In exemplary embodiments, the confectionery injector 30 is made from plastic, but may be made from other materials such as aluminum, food grade stainless steel, etc.

It will be appreciated that embodiments provide several advantages over existing machines. The dual valve injector assembly 10 allows a single machine to be used for injection of confectioneries while still allowing making of cone and dish products. The confectionery injector may be disposable, eliminating drawbacks of the food product sitting in an injector for long periods of time between uses, and possibly spoiling. Alternatively, the confectionery injector may be removed for cleaning or replaced with a cleaned confectionery injector.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A dual valve injector assembly for dispensing a food product at different draw rates, comprising:
   a base;
   a passageway in the base for receiving a food product;
   a first draw valve in communication with the passageway and a first spout, the first spout dispensing the food product received from the passageway at a first draw rate;
   a first draw handle for actuating the first draw valve to supply the food product to the first spout, the first draw rate based upon a spout configuration and a dimension of the first spout, the first spout oriented in a generally vertical direction;
   a second draw valve in communication with the passageway and a second spout, the second spout dispensing the food product received from the passageway at a second draw rate, the second draw rate based upon a spout configuration and a dimension of the second spout, the second spout oriented in a generally horizontal direction;
   a second draw handle for actuating the second draw valve to supply the food product to the second spout; and,
   wherein the second draw rate is lower than the first draw rate, wherein the first draw rate is based on the generally vertical configuration and a dimension of the first spout and the second draw rate is based upon the generally horizontal configuration and a dimension of the second spout, and wherein the first and second spout configurations and dimensions of the first and second spouts control the draw rates during the dispensing of the food product.

2. The dual valve injector assembly of claim 1 wherein: the food product is a frozen food product.

3. The dual valve injector assembly of claim 1 wherein: the first draw rate is about 1 ounce per second and the second draw rate is about ¼ to ⅛ ounce of food product per second.

4. The dual valve injector assembly of claim 1, further comprising a confectionery injector for attachment to the second spout, the confectionery injector includes a mounting end that mounts on to the second spout, the confectionery injector is tubular, the tubular confectionery injector having an injection end for insertion in a confectionery, the confectionery injector having an exterior surface and an interior surface, the exterior surface and the interior surface taper from the mounting end to the injection end, the confectionery injector adapted to inject the food product from the second spout into the confectionery in the generally horizontal direction of the second spout.

5. The dual valve injector assembly of claim 4, wherein an exterior surface of the confectionery injector tapers from the mounting end to the injection end, the confectionery injector having an interior surface, the interior surface tapers from the mounting end to the injection end.

6. The dual valve injector assembly of claim 1, wherein the first spout and the second spout each have an opening for dispensing the food product, and wherein the opening of the second spout is located higher than the opening of the first spout.

7. The dual valve injector assembly of claim 1, wherein the first spout is adapted to dispense the food product into a cup, and wherein the injection end of the confectionery injector is adapted to dispense the food product into the confectionery.

* * * * *